(12) United States Patent
Harel et al.

(10) Patent No.: US 10,371,824 B2
(45) Date of Patent: Aug. 6, 2019

(54) APPARATUS, SYSTEM AND METHOD OF A GLOBAL NAVIGATION SATELLITE SYSTEM (GNSS) MEASUREMENT

(71) Applicant: INTEL IP CORPORATION, Santa Clara, CA (US)

(72) Inventors: Ran Harel, Ramla (IL); Tomer Dahan, Modiin (IL); Ron Rotstein, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 284 days.

(21) Appl. No.: 15/281,114

(22) Filed: Sep. 30, 2016

(65) Prior Publication Data

US 2018/0095179 A1  Apr. 5, 2018

(51) Int. Cl.
*G01S 19/34* (2010.01)
*G01S 19/28* (2010.01)

(52) U.S. Cl.
CPC .............. *G01S 19/34* (2013.01); *G01S 19/28* (2013.01)

(58) Field of Classification Search
CPC ................................. G01S 19/28; G01S 19/34
USPC ............ 342/357.21, 357.25, 357.67, 357.74; 701/469, 490
See application file for complete search history.

(56) References Cited

U.S. PATENT DOCUMENTS

| 2008/0291979 A1 | 11/2008 | Normark et al. |
| 2015/0123847 A1 | 5/2015 | Farmer et al. |
| 2016/0195619 A1 | 7/2016 | Hakanson |
| 2016/0238712 A1 | 8/2016 | Weng et al. |

OTHER PUBLICATIONS

International Search Report and Written Opinion for PCT/US2017/049237, dated Nov. 30, 2017, 10 pages.
International Preliminary Report on Patentability for International Application No. PCT/US2017/049237, dated Apr. 11, 2019, 7 pages.

*Primary Examiner* — Dao L Phan
(74) *Attorney, Agent, or Firm* — Shichrur & Co.

(57) ABSTRACT

Some demonstrative embodiments include apparatuses, devices, systems and methods of a Global Navigation Satellite System (GNSS) measurement. For example, an apparatus may include a GNSS receiver including circuitry to receive GNSS signals; and at least one GNSS processor component configured to determine a plurality of configuration hypotheses including different combinations of one of a plurality of different Space Vehicle (SV) sets and one of a plurality of different duty cycle profiles, the GNSS processor component configured to select from the plurality of configuration hypotheses a selected measurement configuration including a selected SV set and a selected duty cycle profile, based at least on an estimated power consumption corresponding to the selected measurement configuration and an estimated position error corresponding to the selected measurement configuration, the GNSS processor component to configure a GNSS measurement by the GNSS receiver using the selected SV set and according to the selected duty cycle.

25 Claims, 6 Drawing Sheets

APPARATUS, SYSTEM AND METHOD OF A GLOBAL NAVIGATION SATELLITE SYSTEM (GNSS) MEASUREMENT

TECHNICAL FIELD

Embodiments described herein generally relate to a Global Navigation Satellite System (GNSS) measurement.

BACKGROUND

A mobile device may perform a Global Navigation Satellite System (GNSS) measurement, for example, to determine a location of the mobile device.

There is a need for efficient and/or improved GNSS measurement techniques, for example, at least to reduce a power consumption to perform a GNSS measurement and/or to increase an accuracy of the GNSS measurement.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
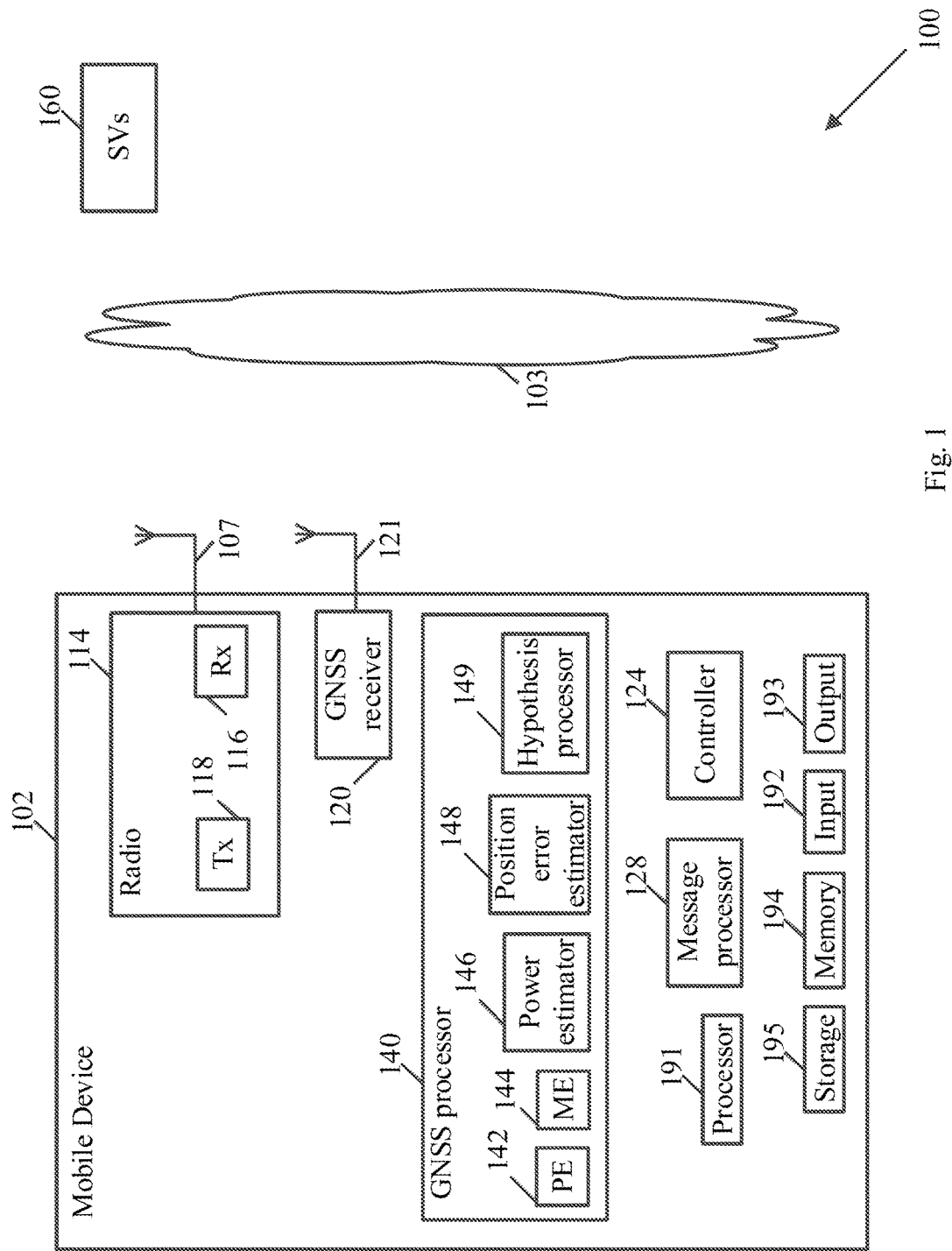
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a hand-held device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmc™/D6.0, June 2016 draft standard for Information technology—Telecommuni-* cations and information exchange between systems Local and metropolitan area networks Specific requirements; Part 11: Wireless LAN Medium Access Control (MAC) and Physical Layer (PHY) Specification"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks— Specific Requirements Part 11: Wireless LAN Medium Access Control (MAC) and Physical Layer (PHY) Specifications—Amendment: Enhanced Throughput for Operation in License-Exempt Bands Above 45 GHz*); and/or IEEE 802.11az (*IEEE 802.11az, Next Generation Positioning*)) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version 1.1, April 2011, Final specification*) and/or future versions and/or derivatives thereof, devices and/or networks operating in accordance with existing WiFi Alliance (WFA) Peer-to-Peer (P2P) specifications (including *WiFi P2P technical specification, version 1.5, Aug. 4, 2014*; and/or *Wi-Fi Neighbor Awareness Networking (NAN) Technical Specification, Version 1.0, May 1, 2015*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102.

In some demonstrative embodiments, device 102 may include a mobile or a portable device.

In some demonstrative embodiments, device 102 may include, for example, a UE, an MD, a STA, an AP, a mobile computer, a laptop computer, an Ultrabook™ computer, a notebook computer, a tablet computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a video source, an audio source, a video sink, an audio sink, a stereo tuner, a broadcast radio receiver, a Personal Media Player (PMP), a digital video camera (DVC), a digital audio player, a gaming device, a data source, a data sink, a Digital Still camera (DSC), a media player, a Smartphone, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In one example, a station (STA) may include a logical entity that is a singly addressable instance of a medium access control (MAC) and physical layer (PHY) interface to the wireless medium (WM). The STA may perform any other additional or alternative functionality.

In one example, an AP STA may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In other embodiments, device 102 may operate as, perform a role of, and/or perform one or more functionalities of, any other additional or alternative device and/or station.

In some demonstrative embodiments, wireless communication device 102 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, device 102 may include a Global Navigation Satellite System (GNSS) receiver 120 including circuitry configured to receive GNSS signals, for example, from one or more space vehicles (SVs) 160, e.g., to determine the location of device 102, e.g., as described below.

In some demonstrative embodiments, GNSS receiver 120 may include, or may be associated with, at least one antenna 121.

In some demonstrative embodiments, SVs 160 may include one or more satellites, e.g., GNSS satellites.

In some demonstrative embodiments, device 102 may include one or more radios including circuitry and/or logic to perform wireless communication between devices 102 and/or one or more other wireless communication devices. For example, device 102 may include at least one radio 114.

In some demonstrative embodiments, GNSS receiver 120 may be implemented as part of, and/or may share one or more elements with, radio 114. In other embodiments, GNSS receiver 120 and radio 114 may be implemented by separate elements, modules and/or units.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receivers 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a directional band, for example, a mmWave band, and/or any other band, for example, a 2.4 GHz band, a 5 GHz band, a S1G band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In one example, device 102 may include a single antenna 107. In another example, device 102 may include two or more antennas 107.

In some demonstrative embodiments, device 102 may include a controller 124. Controller 124 may be configured to perform one or more communications, may generate and/or communicate one or more messages and/or transmissions, and/or may perform one or more functionalities, operations and/or procedures between devices 102 and one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124, respectively. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, message processor 128 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of GNSS receiver 120 and/or radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of GNSS receiver 120 and/or radio 114. For example, the chip or SoC may include one or more elements of controller 124, one or more elements of message processor 128, one or more elements of GNSS receiver 120, and/or one or more elements of radio 114. In one example, controller 124, message processor 128, GNSS receiver 120 and radio 114 may be implemented as part of the chip or SoC.

In other embodiments, controller 124, message processor 128, GNSS receiver 120, and/or radio 114 may be implemented by one or more additional or alternative elements of device 102.

In some demonstrative embodiments, device 102 may be configured to perform a GNSS measurement, for example, to determine the location of device 102, e.g., based on the GNSS signals received by GNSS receiver 120.

In some demonstrative embodiments, device 102 may include at least one GNSS processor component 140 to configure the GNSS measurement, for example, by the GNSS receiver 120.

In some demonstrative embodiments, the at least one GNSS processor component 140 may include circuitry and/or logic, e.g., processor circuitry and/or logic, memory circuitry and/or logic, and/or any other circuitry and/or logic, configured to perform one or more operations and/or functionalities of GNSS processor component 140. Additionally or alternatively, one or more functionalities of GNSS processor component 140 may be implemented by logic, which may be executed by a machine and/or one or more processors, e.g., as described below.

In some demonstrative embodiments, at least part of the functionality of GNSS processor component 140 may be implemented as part of controller 124.

In other embodiments, the functionality of GNSS processor component 140 may be implemented as part of any other element of device 102.

In some demonstrative embodiments, GNSS processor component 140 may include a measurement engine (ME) 144 configured to control, manage and/or configure the GNSS measurement, e.g., as described below.

In some demonstrative embodiments, GNSS processor component 140 may include a positioning processor 142 (also referred to as a "positioning engine (PE)") configured to determine a position estimate of device 102, for example, based on the GNSS measurement, e.g., as described below.

In some demonstrative embodiments, ME 144 may be configured to provide measurement results of the GNSS measurement, for example, to PE 142, e.g., to enable PE 142 to determine the position estimate of device 102.

In some demonstrative embodiments, one or more functionalities of ME 144 and one or more functionalities of PE 142 may be implemented by a same, e.g., a shared, GNSS processor component 140.

In some demonstrative embodiments, ME 144 and PE 142 may be implemented as separate modules, elements, components, and/or units of GNSS processor component 140.

In one example, GNSS processor component 140 may include processor circuitry, one or more first logic components to cause the processor circuitry to perform one or more operations and/or functionalities of ME 144, and one or more second logic components to cause the processor circuitry to perform one or more operations and/or functionalities of PE 142.

In another embodiment, GNSS processor component 140 may include one or more processor components to perform one or more operations and/or functionalities of ME 144, and one or more processor components to perform one or more operations and/or functionalities of PE 142.

In some demonstrative embodiments, performing a GNSS measurement may consume power of a power source of device 102.

In some demonstrative embodiments, the GNSS measurement may be configured according to one or more configurations ("GNSS power adjustments") for example, to allow reducing a power consumption of the GNSS measurement according to one or more power consumption strategies. For example, the power consumption strategies may include at least reduced track capabilities, e.g., using fewer track channels and/or search channels, a duty cycle operating mode, and/or reducing a duty cycle, in which RF and/or baseband elements of device 102 may be allowed to be awake, e.g., within a given reporting time.

In some demonstrative embodiments, the power consumption strategies may be able to provide only a coarse power adjustment and/or the power consumption strategies cannot provide a fine power adjustment, for example, if the power consumption strategies are implemented at measurement engine 144 autonomously, and/or if measurement engine 144 is not provided with sufficient knowledge of an environment of device 102 and/or of a behavior of a user of device 102, to allow effective controlling of GNSS measurements and/or power decisions.

In some demonstrative embodiments, the coarse level of power adjustments may not meet power and/or performance requirements, for example, in complicated RF environments, e.g., such as urban canyons with turn by turn driving scenarios.

In some demonstrative embodiments, in some use cases, deployments, scenarios and/or implementations, it may not be advantageous, and/or it may be inefficient, to implement an architecture, which includes a hard separation between ME 144 and PE 142, for example, where the PE 142 may send aiding data to ME 144, and/or ME 144 may send measurements results to PE 142, e.g., without allowing the PE 142 and the ME 144 a flexibility to exchange data and/or collaborate in managing the GNSS measurement. For example, such an architecture may lack an ability of the PE to provide to ME information, which may allow the ME to make improved decisions on the GNSS measurements. In one example, according to such an architecture measurement, engine 144 may not have enough knowledge of an environment of device 102 and/or a user behavior of a user of device 102, for example, to efficiently determine the power adjustments of the GNSS measurement. In another example, it may not be efficient to implement a duty cycle strategy, which is configured to use a best effort in looking for all available SVs, while allowing to tune power, for example, since this approach may fail to take into account information on whether or not an SV is visible, and/or a possibility of easing one or more duty cycle parameters upon meeting a position error criteria.

In some demonstrative embodiments, GNSS processor component 140 may be configured to implement a GNSS measurement scheme, which may be configured, for example, at least to improve a power consumption and/or an accuracy of the GNSS measurement, e.g., as described below.

In some demonstrative embodiments, the GNSS measurement scheme may be configured to assess an estimated state accuracy for a large range of hypothetical power configurations, and to select a hypothetical power configuration of the hypothetical power configurations, which satisfies one or more criteria, for example, in terms of user requirements and/or a best power to accuracy trade-off, e.g., as described below.

In some demonstrative embodiments, GNSS processor component 140 may be configured to determine and/or evaluate a plurality of SV measurement configuration hypotheses, which may allow to dynamically adjust a duty cycle, for example, to meet one or more power and/or accuracy budgets, e.g., as described below.

In some demonstrative embodiments, GNSS processor component 140 may be configured to determine a plurality of configuration hypotheses.

In some demonstrative embodiments, the configuration hypotheses may include different combinations of one of a plurality of different SV sets, e.g., of SVs 160, and one of a plurality of different duty cycle profiles. For example, each configuration hypothesis may include a combination of a set of SVs and a duty cycle profile, e.g., as described below.

In some demonstrative embodiments, a duty cycle profile may include, for example, a definition of power on/off durations to power on/power off GNSS receiver 120.

In some demonstrative embodiments, GNSS processor component 140 may be configured to select from the plurality of configuration hypotheses a selected measurement configuration, e.g., as described below.

In some demonstrative embodiments, the selected measurement configuration may include a selected SV set, and a selected duty cycle profile.

In some demonstrative embodiments, GNSS processor component 140 may be configured to select the selected measurement configuration, for example, based at least on an estimated power consumption corresponding to the selected measurement configuration, and an estimated position error corresponding to the selected measurement configuration, e.g., as described below.

In some demonstrative embodiments, GNSS processor component 140 may be configured to configure a GNSS measurement by the GNSS receiver 120, for example, based on the selected measurement configuration, e.g., using the selected SV set and according to the selected duty cycle, e.g., as described below.

In some demonstrative embodiments, GNSS processor component 140 may include a power estimator component 146 configured to estimate a plurality of power consumption values corresponding to respective ones of the plurality of configuration hypotheses, e.g., as described below.

In one example, power estimator component 146 may include a computational entity, e.g., including circuitry and/or logic, configured to compute an expected power consumption of a configuration hypothesis, e.g., as described below.

In some demonstrative embodiments, GNSS processor component 140 may include a position error estimator 148 configured to estimate a plurality of position error values corresponding to respective ones of the plurality of configuration hypotheses, e.g., as described below.

In some demonstrative embodiments, GNSS processor component 140 may be configured to determine the estimated position error corresponding to the selected measurement, for example, based on a Least-Square (LS) error covariance calculation, e.g., as described below. In other embodiments, GNSS processor component 140 may be configured to determine the estimated position error corresponding to the selected measurement based on any other additional or alternative position estimation algorithm, method and/or technique.

In one example, position error estimator 148 may include an LS error covariance computation entity, including circuitry and/or logic configured to compute an LS error covariance computation representing an expected positioning performance, e.g., an estimated positioning error, of a configuration hypothesis.

In some demonstrative embodiments, GNSS processor component 140 may include a hypothesis processor component 149 configured to determine the plurality of configuration hypotheses, e.g., as described below.

In some demonstrative embodiments, hypothesis processor component 149 may be configured to determine the selected measurement configuration, for example, based on at least one selection criterion applied to the plurality of power consumption values and the plurality of position error values, e.g., as described below.

In some demonstrative embodiments, the selection criterion may include a power consumption criterion, and/or a position error criterion, e.g., as described below. In some demonstrative embodiments, the selection criterion may include one or more additional or alternative selection criteria, e.g., based on one or more additional or alternative parameters, and/or requirements.

In some demonstrative embodiments, GNSS processor component 140 may be configured to receive a selection criterion indicator to indicate preference between the power budget criterion and the positioning performance budget criterion. For example, GNSS processor component 140 may receive the selection criterion indicator from another component of device 102, for example, from an application, e.g., a positioning-based application, which may utilize results of the GNSS measurement performed by GNSS receiver 120. In another example, GNSS processor component 140 may receive the selection criterion indicator from any other component of device 102, for example, from a user interface of device 102, an operating system of device 102, a power management application of device 102, an interface to a service provider, and/or any other application and/or component of device 102. In another example, the selection criterion indicator may be preconfigured and/or preset.

In some demonstrative embodiments, GNSS processor component 140 may be configured to determine the selected measurement configuration according to the power budget criterion or the positioning performance budget criterion, for example, based on the selection criterion indicator, e.g., as described below.

In some demonstrative embodiments, GNSS processor component 140 may be configured to search a space including all possible configuration hypotheses for a selected measurement, which satisfies the required selection criterion, e.g., as described below.

In some demonstrative embodiments, GNSS processor component 140 may be configured to determine the selected measurement configuration, for example, based on a power consumption limit, and/or a position error limit, e.g., as described below.

In some demonstrative embodiments, GNSS processor component 140 may be configured to determine the selected measurement configuration according to the power budget criterion, e.g., as described below.

In some demonstrative embodiments, the power budget criterion may be configured, for example, to allow achieving a maximum positioning performance, for example, given a power budget constraint, e.g., a maximum number of milliWatt (mW).

In one example, the power budget criterion may be applied, for example, at least for a power budget limited navigation scenario, and/or any other use case, scenario, deployment and/or implementation.

In some demonstrative embodiments, GNSS processor component 140 may be configured to select the selected measurement configuration, for example, such that the estimated power consumption corresponding to the selected measurement configuration may be equal to or below the power consumption limit, e.g., as described below.

In some demonstrative embodiments, GNSS processor component 140 may be configured to select the selected measurement configuration, for example, such that the estimated position error corresponding to the selected measurement configuration may be a lowest of estimated position errors corresponding to configuration hypotheses having an estimated power consumption equal to or below the power consumption limit, e.g., as described below.

In some demonstrative embodiments, GNSS processor component 140 may be configured to determine the selected measurement configuration according to the positioning performance budget criterion, e.g., as described below.

In some demonstrative embodiments, the power budget criterion may be configured, for example, to allow achieving a minimal power performance, for example, given a position performance budget constraint, e.g., a maximal horizontal and/or vertical position error, or a relative position error compared to a configuration hypothesis having higher power consumption, e.g., a maximal power configuration, e.g., as described below.

In one example, the positioning performance budget criterion may be applied, for example, for a positioning performance budget limited navigation scenario and/or any other use case, scenario, deployment and/or implementation.

In some demonstrative embodiments, GNSS processor component 140 may be configured to select the selected measurement configuration, for example, such that the estimated position error corresponding to the selected measurement configuration is equal to or below the position error limit.

In some demonstrative embodiments, GNSS processor component 140 may be configured to select the selected measurement configuration, for example, such that the estimated power consumption corresponding to the selected measurement configuration is a lowest of estimated power consumptions corresponding to configuration hypotheses having an estimated position error equal to or below the position error limit, e.g., as described below.

In some demonstrative embodiments, GNSS processor component 140 may be configured to consider whether or not an SV, which is included in a configuration hypothesis, is actually available for a GNSS measurement ("SV exists"), for example, when processing the plurality of configuration hypotheses to determine the selected measurement configuration, e.g., as described below.

In some demonstrative embodiments, GNSS processor component 140 may be configured to determine an estimated position error corresponding to a configuration hypothesis including an SV set having at least one currently invisible SV, based on a combination of a first estimated position error corresponding to the SV set including the at least one currently invisible SV and a second estimated position error corresponding to the SV set excluding the at least one currently invisible SV, e.g., as described below.

In some demonstrative embodiments, GNSS processor component 140 may be configured dynamically determine the selected measurement configuration, for example, at least to allow reducing power consumption of the GNSS measurement, to decide upon environmental conditions to evaluate the selected measurement configuration, and/or to determine whether or not a better configuration hypothesis exists, and/or to provide one or more additional or alternative benefits.

In some demonstrative embodiments, GNSS processor component 140 may be configured to repeat determining the selected measurement configuration, for example, periodically and/or based on any suitable measurement configuration scheme, e.g., as described below.

In some demonstrative embodiments, GNSS processor component 140 may be configured to repeat determining the selected measurement configuration, for example, upon detection of an additional SV, upon disappearance of an SV, upon a change in a Signal to Noise Ratio (SNR) of the GNSS receiver 120, a preconfigured time period or a configurable time period since a previous determining of the selected measurement configuration, and/or based on any additional or alternative criterion.

In some demonstrative embodiments, PE 142 may determine a position estimate of device 102, for example, based on the GNSS measurement of GNSS receiver 120 according to the selected measurement configuration.

In some demonstrative embodiments, GNSS processor component 140 may allow collaboration between ME 144 and PE 142, for example, to enable ME 144 to utilize data available at PE 142, e.g., as described above.

In some demonstrative embodiments, configuring GNSS processor component 140 to select the selected measurement configuration from the plurality of configuration hypotheses, e.g., as described above, may allow, for example, taking into consideration information relating to the SVs 160, for example, whether or not an SV actually exists. And/or may allow easing duty cycle parameters, for example, upon meeting positioning error criteria, e.g., as described below.

In some demonstrative embodiments, configuring GNSS processor component 140 to select the selected measurement configuration from the plurality of configuration hypotheses, e.g., as described above, may allow, for example, a capability of dynamically changing duty cycle profiles, for example, to meet power and/or accuracy budgets, e.g., as described below.

Figure 2:
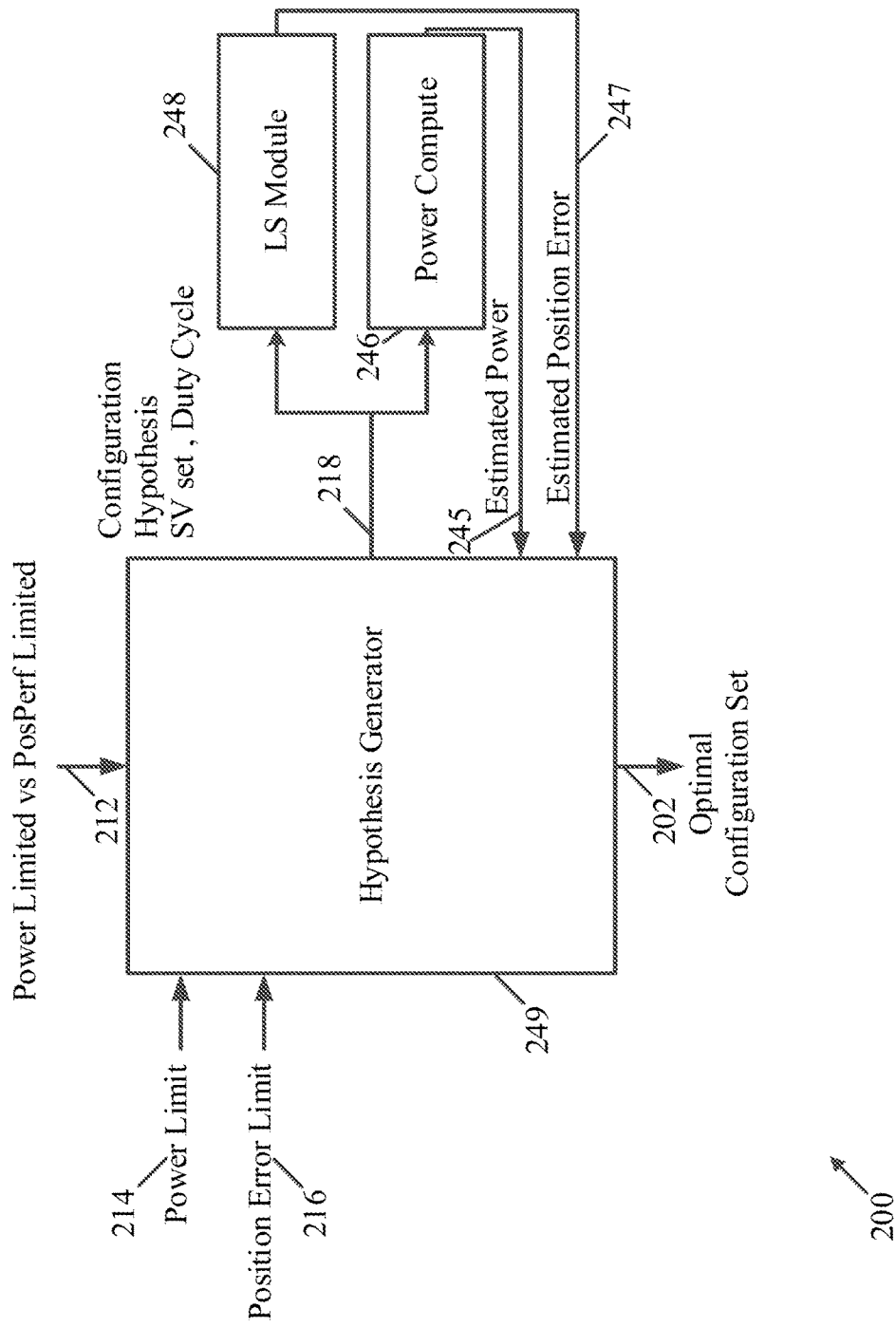
FIG. 2 is a schematic block diagram illustration of a Global Navigation Satellite System (GNSS) processor component architecture, in accordance with some demonstrative embodiments.

Reference is made to FIG. 2, which schematically illustrates a GNSS processor component architecture 200, in accordance with some demonstrative embodiments.

In some demonstrative embodiments, GNSS processor component architecture 200 may be configured to determine and/or output a selected measurement configuration 202. For example, GNSS processor component architecture 200 may perform one or more operations and/or functionalities of GNSS processor component 140 (FIG. 1).

In some demonstrative embodiments, as shown in FIG. 2, GNSS processor component architecture 200 may include a hypothesis generator 249. For example, hypothesis generator 249 may perform one or more operations and/or functionalities of hypothesis processor component 149 (FIG. 1).

In some demonstrative embodiments, as shown in FIG. 2, GNSS processor component architecture 200 may include a least square (LS) module 248. For example, LS module 248 may perform one or more operations and/or functionalities of position error estimator 148 (FIG. 1).

In some demonstrative embodiments, as shown in FIG. 2, GNSS processor component architecture 200 may include a power estimator 246. For example, power estimator 246 may perform one or more operations and/or functionalities of power estimator 146 (FIG. 1).

In some demonstrative embodiments, as shown in FIG. 2, hypothesis generator 249 may be configured to receive a selection criterion indicator 212 to indicate a selection criterion, for example, a preference between two or more selection criteria, e.g., a power budget criterion and the positioning performance budget criterion.

In some demonstrative embodiments, as shown in FIG. 2, hypothesis generator 249 may receive a first value including a value of a power consumption limit 214, and/or a second value including a value of a position error limit 216.

In some demonstrative embodiments, as shown in FIG. 2, hypothesis generator 249 may be configured to determine a plurality of configuration hypotheses 218, for example, corresponding to a plurality of SVs, e.g., SVs 160 (FIG. 1), and a plurality of duty cycle profiles.

In some demonstrative embodiments, as shown in FIG. 2, power estimator 246 may be configured to estimate a plurality of power consumption values 245 corresponding to the plurality of configuration hypotheses 218.

In some demonstrative embodiments, as shown in FIG. 2, LS module 248 may be configured to estimate a plurality of position error values 247 corresponding to the plurality of configuration hypotheses 218.

In some demonstrative embodiments, hypothesis generator 249 may be configured to determine and output the selected measurement configuration 202, for example, based on the plurality of position error values 247, the plurality of power consumption values 245, the selection criterion indicator 212, the power consumption limit 214 and/or the position error limit 216, e.g., as described below.

Figure 3:
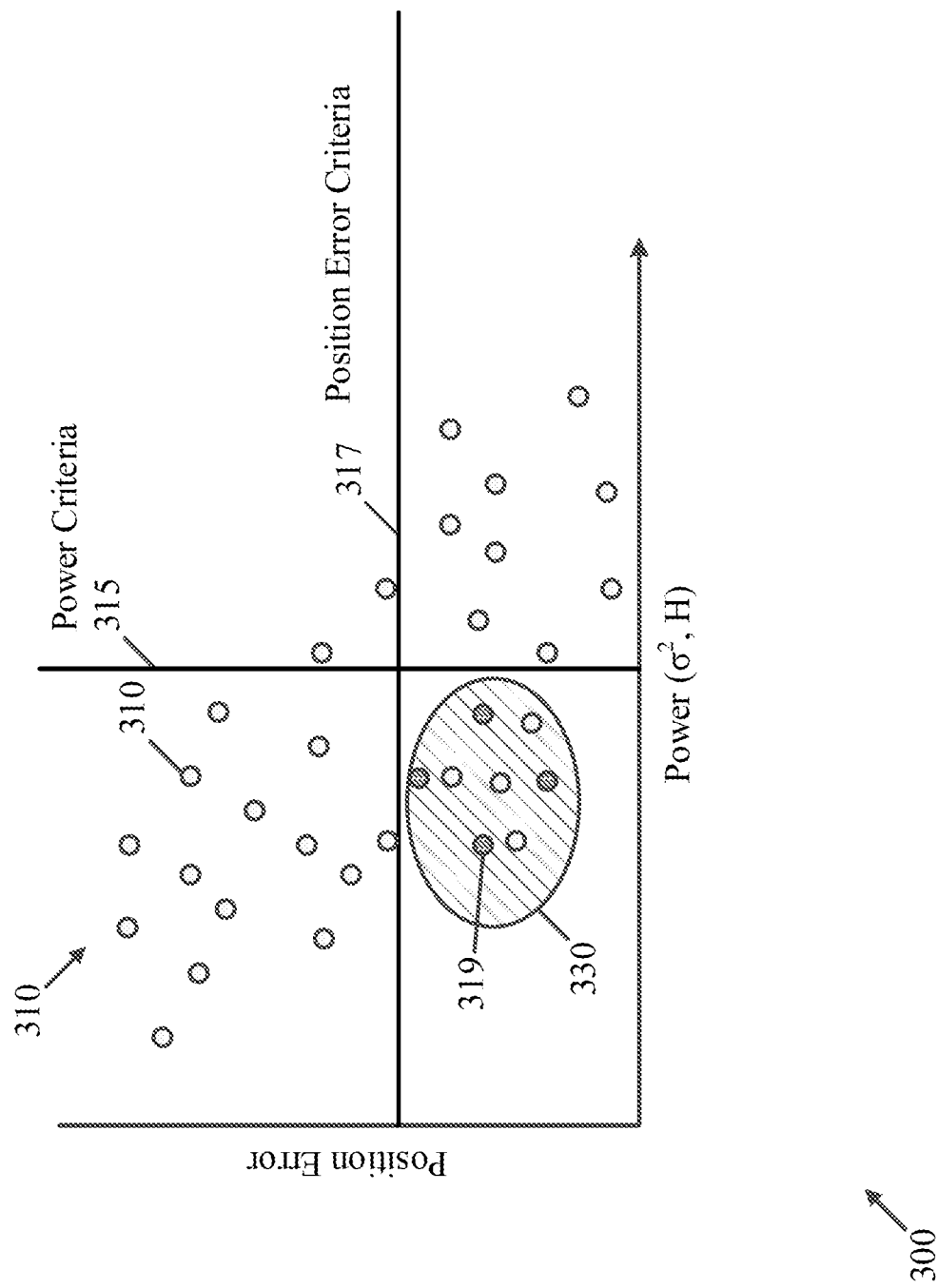
FIG. 3 is a schematic illustration of a graph depicting position error values and power consumption values corresponding to a plurality of configuration hypotheses, in accordance with some demonstrative embodiments.

Reference is made to FIG. 3, which schematically illustrates a graph 300 depicting a plurality of position error values and power consumption values corresponding to a plurality of configuration hypotheses 310, in accordance with some demonstrative embodiments.

In some demonstrative embodiments, as shown in FIG. 3, an X-axis of graph 300 depicts power consumption values corresponding to the configuration hypotheses 310; and a Y-axis of graph 300 depicts positioning error values corresponding to the configuration hypotheses 310, e.g., as may be seen by a user application.

In some demonstrative embodiments, hypothesis generator 249 (FIG. 2) may be configured to determine the plurality of configuration hypotheses 310, for example, based on an available plurality of SVs and one or more duty cycle profiles.

In some demonstrative embodiments, a configuration hypothesis 310 may represent a set of SVs, denoted H, and a variance set, denoted $\sigma^2$, corresponding to a duty cycle profile.

In some demonstrative embodiments, hypothesis generator 249 (FIG. 2) may be configured to search the plurality of configuration hypotheses 310 for a selected configuration hypothesis 310, which satisfies, for example, a power consumption limit 315 and a position error limit 317, e.g., as described below.

In some demonstrative embodiments, as shown in FIG. 3, hypothesis generator 249 (FIG. 2) may determine a set 330 of configuration hypotheses. The set 330 of configuration hypotheses may include, for example, configuration hypotheses, which satisfy both the power consumption limit 315 and the position error limit 317.

In some demonstrative embodiments, hypothesis generator 249 (FIG. 2) may store the configuration hypotheses of set 330 to a database.

In some demonstrative embodiments, hypothesis generator 249 (FIG. 2) may be configured to select a selected configuration hypothesis from set 330, for example, based on one or more selection criteria, for example, according to indication 212 (FIG. 2).

In some demonstrative embodiments, hypothesis generator 249 (FIG. 2) may be configured to select from set 330 a selected configuration hypothesis, e.g., a configuration hypothesis 319, which provides best results, for example, a lowest power consumption and/or a lowest estimated position error, for example, with respect to other configuration hypotheses in set 330.

In some demonstrative embodiments, hypothesis generator 249 (FIG. 2) may be configured to select configuration hypothesis 319 as a candidate for a GNSS measurement, for example, to be considered by ME 144 (FIG. 1), e.g., as defined by a current SNR and/or one or more other environmental parameters.

In some demonstrative embodiments, other configuration hypotheses of set 330 may be considered, for example, when repeating a selection of the configuration hypotheses.

Figure 4:
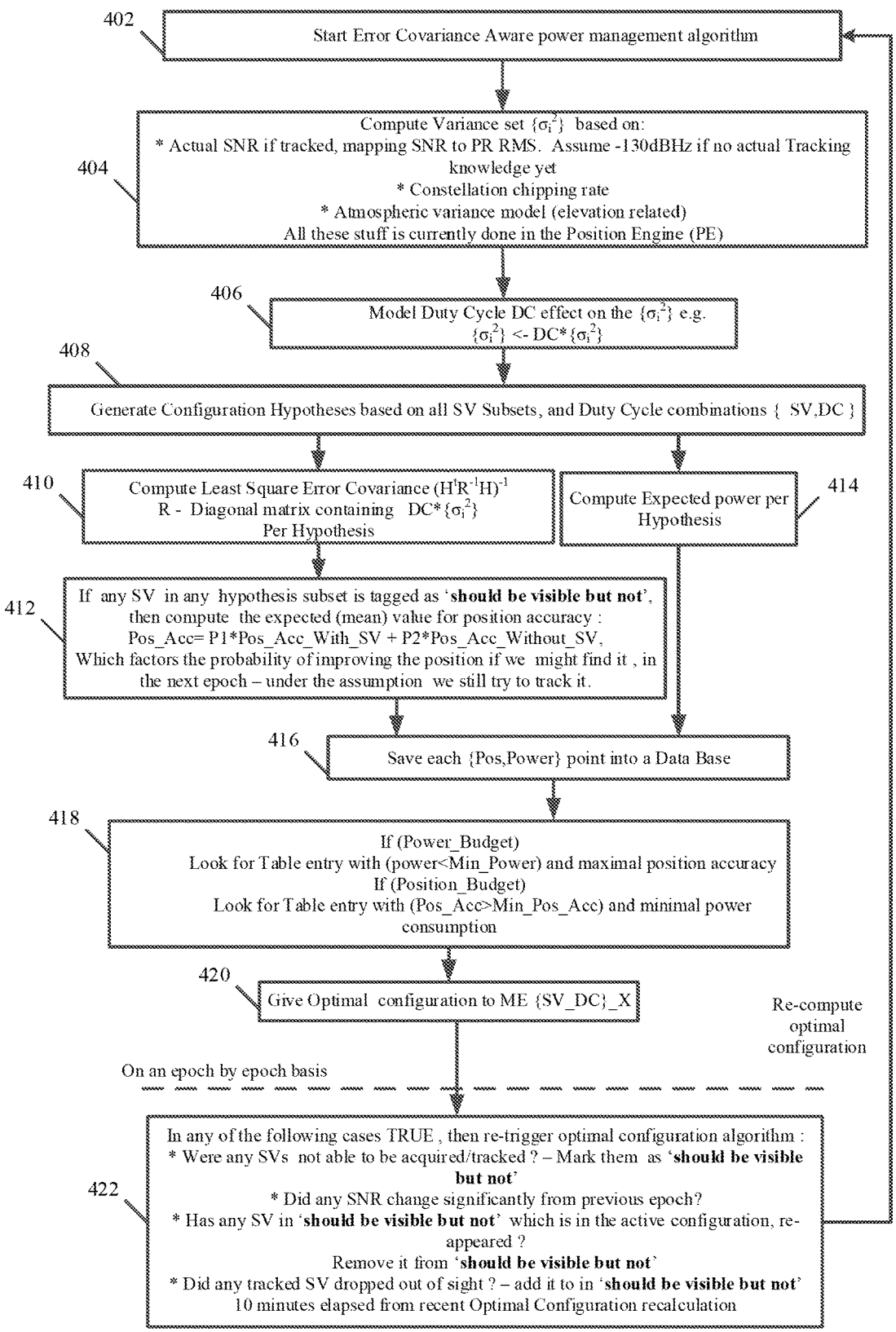
FIG. 4 is a schematic flow-chart illustration of a method of selecting a GNSS measurement configuration, in accordance with some demonstrative embodiments.

Reference is made to FIG. 4, which schematically illustrates a method of selecting a GNSS measurement configuration, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1); a controller, e.g., controller 124 (FIG. 1); a GNSS receiver, e.g., GNSS receiver 120 (FIG. 1); a PE, e.g., PE 142 (FIG. 1); a ME, e.g., ME 144 (FIG. 1); a GNSS processor component, e.g., GNSS processor component 140 (FIG. 1); a power estimator component, e.g., power estimator component 146 (FIG. 1) and/or power estimator 246 (FIG. 2); a position error estimator, e.g., position error estimator 148 (FIG. 1) and/or position error estimator 248 (FIG. 2); and/or a hypothesis processor component, e.g., hypothesis processor component 149 (FIG. 1) and/or hypothesis generator 249 (FIG. 2).

As indicated at block 402, the method may include initiating a selection of a GNSS measurement configuration.

As indicated at block 404, the method may include determining a variance set corresponding to a duty cycle.

As indicated at block 406, the method may include modeling a duty cycle effect on the variance set.

In one example, if a duty cycle impact on the variance set is modeled as a multiplicative factor, an error covariance per duty cycle hypothesis may be greatly simplified, for example, by extracting the error covariance as a common factor scalar from an error covariance computation, e.g., as follows:

$$DC_{factor} * (H^T R^{-1} H)^{-1} \tag{1}$$

As indicated at block 408, the method may include determining a plurality of configurations hypotheses. For example, GNSS processor component 140 (FIG. 1) may determine the plurality of configurations hypotheses, e.g., as described above.

In one example, accounting for all possible SV subsets, e.g., all permutations, may yield a high number of alternatives, e.g., as follows:

$$N_{SVsets} = \sum_{m=1}^{N} \frac{N!}{(N-m)!m!} \tag{2}$$

wherein m denotes the number of all SVs, and N denotes a number of SVs in an SV group of the m SVs.

In some demonstrative embodiments, a subset of SVs, e.g., of all possible SV subsets, may be determined, for example, to enable a practical implementation, e.g., as described below.

In some demonstrative embodiments, an error covariance may be determined with respect to a set, denoted M, including all SVs, e.g., M=N.

In some demonstrative embodiments, an updated SV set including one less SV, e.g., M=M−1, may be determined, for example, by removing from the set M and SV having a worst impact on the error covariance of the set.

For example, M error covariance results may be computed with respect to M different sets, each having a different SV removed. For example, the SV resulting in a worst error covariance result may be removed.

In some demonstrative embodiments, the remaining set of M−1 SVs may be maintained as a new "M" subset, e.g., instead of testing all the permutations.

In some demonstrative embodiments, the operations may include going back to the second operation, e.g., to perform operation on the new "M" subset.

In some demonstrative embodiments, the operations of determining the updated SV set with respect to the new subset may be iteratively repeated, based on at least one convergence criterion, for example, until reaching Zero Degrees of Freedom (DOF), e.g., when a number of unknowns equal to a number of permutations.

In some demonstrative embodiments, the number of iterative adjustment of the SV set may include, for example, N+(N−1)+(N−2)+(N−3) . . . iterations, which may be equal to $N^2$ iterations. These iterations may yield, for example, a group of SVs including N maximal SV Subset Configurations. This group of subset configurations may be used to determine the plurality of hypotheses configurations using different Duty Cycle numbers.

As indicated at block 410, the method may include determining a LS error covariance for a configuration hypothesis, e.g., for each configuration hypothesis. For example, position error estimator 148 (FIG. 1) may determine the position error values corresponding to the plurality of configuration hypotheses, e.g., as described above.

As indicated at block 412, the method may include determining a LS error covariance for a configuration hypothesis having at least one currently invisible SV. For example, position error estimator 148 (FIG. 1) may determine the position error corresponding to a configuration hypothesis having the least one currently invisible SV, e.g., as described above.

In one example, at least one currently invisible SV, which may currently not be tracked and/or acquired, e.g., due to environmental blocking and/or one or more other reasons, may be part of a configuration hypothesis having a high performance, and/or may have a significant contribution to a Dilution of Precision (DOP) of the configuration hypothesis. According to this example, it may be advantageous to perform a re-computation of all other configuration hypotheses, for example, excluding the currently invisible SV, e.g., since the currently invisible SV may not be tracked. However, excluding the currently invisible SV may degrade an optimal configuration hypothesis, for example, if the currently invisible SV may actually be visible, e.g., after a short period of time, e.g., a few seconds.

In some demonstrative embodiments, a probability to find the currently invisible SV on a next search may be assigned, for example, if the SV is being search on the next search.

In some demonstrative embodiments, position accuracy of a configuration hypothesis corresponding to an SV set including at least one invisible SV may be determined, for example, based on a probability that the currently invisible SV will be detectable at a next epoch. For example, a mean value, denoted Mean_SVX_Accuracy, of a position accuracy of a configuration hypothesis may be determined, for example, based on a first position accuracy, denoted Pos_Acc_With_SVX, e.g., assuming the SV is found, a second position accuracy of the configuration hypothesis, denoted Pos_Acc_WithOut_SVX, e.g., assuming the SV is not found, a probability to find the SV, denoted P(Found), and a probability not to find the SV, denoted P (Not_Found), e.g., as follows:

$$\text{Mean\_SVX\_Accuracy} = P(\text{Found}) * \text{Pos\_Acc\_With\_SVX} + P(\text{Not\_Found}) * \text{Pos\_Acc\_WithOut\_SVX} \qquad (3)$$

In some demonstrative embodiments, an estimated power consumption, denoted Power_with_SVX, of the configuration hypothesis may be determined, e.g., assuming the SV is still being searched, for example, if a search procedure and a track procedure for an SV consume the same power.

In some demonstrative embodiments, a working point corresponding to the configuration hypothesis, denoted (Power_with_SVX, Mean_SVX_Accuracy), may be determined based on the estimated power consumption and the estimated position error of the configuration hypothesis.

In some demonstrative embodiments, an estimation of the power consumption and/or position error accuracy may be repeated, for example, to determine whether or not the configuration hypothesis is better than other configuration hypotheses.

As indicated at block 414, the method may include determining a power consumption value for a configuration hypothesis, For example, power estimator 146 (FIG. 1) may determine the power consumption values of the plurality of configuration hypotheses, e.g., as described above.

As indicated at block 416, the method may include saving power consumption values and positioning error values for each of the plurality of configurations hypotheses in a database, e.g., as described above.

As indicated at block 418, the method may include determining a selected measurement configuration, based on a selection criterion. For example, GNSS processor component 140 (FIG. 1) may select the selected configurations hypothesis, fore example, according to the power budget criterion or the positioning performance budget criterion, e.g., as described above.

As indicated at block 420, the method may include configuring a GNSS measurement based on the selected measurement configuration. For example, GNSS processor component 140 (FIG. 1) may configure a GNSS measurement by GNSS receiver 120 (FIG. 1) using the selected measurement configuration, e.g., as described above.

As indicated at block 422, the method may include repeating determining the selected measurement configuration. For example, GNSS processor component 140 (FIG. 1) may repeat determining the selected measurement configuration, e.g., as described above.

In one example, the selection of the measurement configuration from the GNSS measurement may be repeated, for example, on an epoch-by-epoch basis. For example, SNRs of SVs may be monitored, and, for example, if an SV of a configurations hypothesis is invisible, or if a currently invisible SV in the configuration hypothesis is acquired, processor component 140 (FIG. 1) may repeat the selection, for example, while taking into account the invisible SV and/or the acquired SV.

Figure 5:
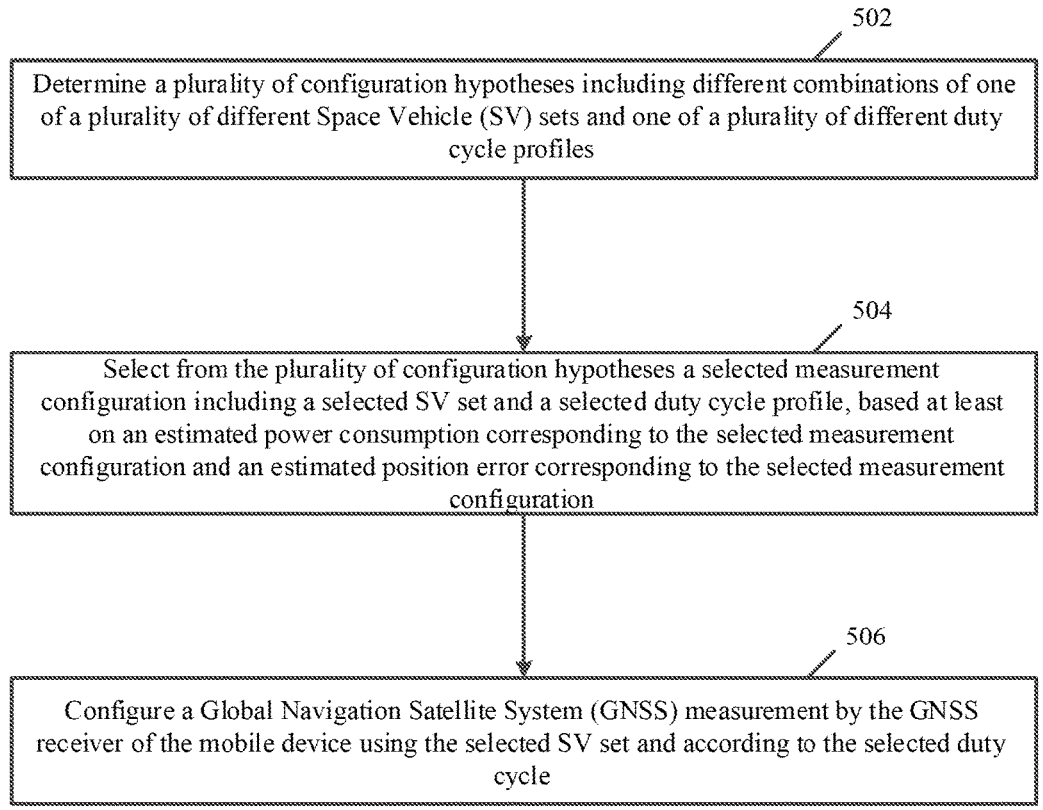
FIG. 5 is a schematic flow-chart illustration of a method of GNSS measurement, in accordance with some demonstrative embodiments.

Reference is made to FIG. 5, which schematically illustrates a method of GNSS measurement, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1); a controller, e.g., controller 124 (FIG. 1); a GNSS receiver, e.g., GNSS receiver 120 (FIG. 1); a PE, e.g., PE 142 (FIG. 1); a ME, e.g., ME 144 (FIG. 1);

a GNSS processor component, e.g., GNSS processor component 140 (FIG. 1); a power estimator component, e.g., power estimator component 146 (FIG. 1) and/or power estimator 246 (FIG. 2); a position error estimator, e.g., position error estimator 148 (FIG. 1) and/or position error estimator 248 (FIG. 2); and/or a hypothesis processor component, e.g., hypothesis processor component 149 (FIG. 1) and/or hypothesis generator 249 (FIG. 2).

As indicated at block 502, the method may include determining a plurality of configuration hypotheses including different combinations of one of a plurality of different SV sets and one of a plurality of different duty cycle profiles. For example, GNSS processor component 140 (FIG. 1) may determine the plurality of configurations hypotheses 310 (FIG. 3), e.g., as described above.

As indicated at block 504, the method may include selecting from the plurality of configuration hypotheses a selected measurement configuration including a selected SV set and a selected duty cycle profile, based at least on an estimated power consumption corresponding to the selected measurement configuration and an estimated position error corresponding to the selected measurement configuration. For example, GNSS processor component 140 (FIG. 1) may select from plurality of configuration hypotheses the selected measurement configuration, for example, based on the estimated power consumption values and the estimated position error values corresponding to configurations hypotheses 310 (FIG. 3), e.g., as described above.

As indicated at block 506, the method may include configuring a GNSS measurement using the selected SV set and according to the selected duty cycle. For example, GNSS processor component 140 (FIG. 1) may configure the GNSS measurement for GNSS receiver 120 (FIG. 1) using the selected SV set and according to the selected duty cycle, e.g., as described above.

Figure 6:
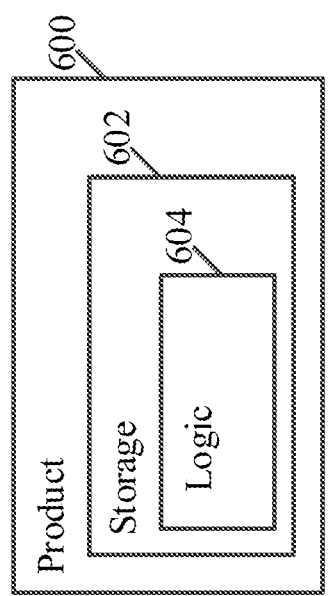
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at device 102, GNSS receiver 120 (FIG. 1), PE 142 (FIG. 1), ME 144 (FIG. 1), GNSS processor component 140 (FIG. 1), power estimator component 146 (FIG. 1), power estimator 246 (FIG. 2), position error estimator 148 (FIG. 1), position error estimator 248 (FIG. 2), hypothesis processor component 149 (FIG. 1) and/or hypothesis generator 249 (FIG. 2), and/or to perform one or more operations described above with respect to FIGS. 1, 2, 3, 4, and/or 5, and/or one or more operations described herein. The phrase "non-transitory machine-readable medium" is directed to include all computer-readable media, with the sole exception being a transitory propagating signal.

In some demonstrative embodiments, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, machine-readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a Global Navigation Satellite System (GNSS) receiver comprising circuitry to receive GNSS signals; and at least one GNSS processor component configured to determine a plurality of configuration hypotheses comprising different combinations of one of a plurality of different Space Vehicle (SV) sets and one of a plurality of different duty cycle profiles, the GNSS processor component configured to select from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, the GNSS processor component to configure a GNSS measurement by the GNSS receiver using the selected SV set and according to the selected duty cycle.

Example 2 includes the subject matter of Example 1, and optionally, wherein the at least one GNSS processor component comprises a power estimator component to estimate a plurality of power consumption values corresponding to respective ones of the plurality of configuration hypotheses; a position error estimator to estimate a plurality of position error values corresponding to respective ones of the plurality of configuration hypotheses; and a hypothesis processor component to determine the plurality of configuration hypotheses, and to determine the selected measurement configuration based on a selection criterion applied to the plurality of power consumption values and the plurality of position error values.

Example 3 includes the subject matter of Example 1 or 2, and optionally, wherein the GNSS processor component is to determine the selected measurement configuration based on at least one of a power consumption limit, or a position error limit.

Example 4 includes the subject matter of Example 3, and optionally, wherein the GNSS processor component is configured to determine the selected measurement configuration according to a power budget criterion, the estimated power consumption corresponding to the selected measurement is equal to or below the power consumption limit, and the estimated position error corresponding to the selected measurement configuration is a lowest of estimated position errors corresponding to configuration hypotheses having an estimated power consumption equal to or below the power consumption limit.

Example 5 includes the subject matter of Example 3, and optionally, wherein the GNSS processor component is configured to determine the selected measurement configuration according to a positioning performance budget criterion, the estimated position error corresponding to the selected measurement is equal to or below the position error limit, and the estimated power consumption corresponding to the selected measurement configuration is a lowest of estimated power consumptions corresponding to configuration hypotheses having an estimated position error equal to or below the position error limit.

Example 6 includes the subject matter of any one of Examples 1-5, and optionally, wherein the GNSS processor component is configured to receive a selection criterion indicator to indicate preference between a power budget criterion and a positioning performance budget criterion, and, based on the selection criterion indicator, to determine the selected measurement configuration according to the power budget criterion or the positioning performance budget criterion.

Example 7 includes the subject matter of any one of Examples 1-6, and optionally, wherein the GNSS processor component is configured to determine the estimated position error corresponding to the selected measurement configuration based on a Least-Square (LS) error covariance calculation.

Example 8 includes the subject matter of any one of Examples 1-7, and optionally, wherein the GNSS processor component is configured to determine an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

Example 9 includes the subject matter of any one of Examples 1-8, and optionally, wherein the GNSS processor component is configured to repeat determining the selected measurement configuration upon at least one of detection of an additional SV, disappearance of an SV, a change in a Signal to Noise Ratio (SNR) of the GNSS receiver, or a time period since determining the selected measurement configuration.

Example 10 includes the subject matter of any one of Examples 1-9, and optionally, wherein the at least one GNSS processor component comprises a positioning processor configured determine a position estimate based on the GNSS measurement.

Example 11 includes the subject matter of any one of Examples 1-10, and optionally, comprising one or more antennas, and a memory.

Example 12 includes a mobile device comprising one or more antennas; a memory; a processor; a Global Navigation Satellite System (GNSS) receiver comprising circuitry to receive GNSS signals via the one or more antennas; and at least one GNSS processor component configured to determine a plurality of configuration hypotheses comprising different combinations of one of a plurality of different Space Vehicle (SV) sets and one of a plurality of different duty cycle profiles, the GNSS processor component configured to select from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, the GNSS processor component to configure a GNSS measurement by the GNSS receiver using the selected SV set and according to the selected duty cycle, GNSS the processor component configured to determine a position estimate of the mobile device based on the GNSS measurement.

Example 13 includes the subject matter of Example 12, and optionally, wherein the at least one GNSS processor component comprises a power estimator component to estimate a plurality of power consumption values corresponding to respective ones of the plurality of configuration hypotheses; a position error estimator to estimate a plurality of position error values corresponding to respective ones of the plurality of configuration hypotheses; and a hypothesis processor component to determine the plurality of configuration hypotheses, and to determine the selected measurement configuration based on a selection criterion applied to the plurality of power consumption values and the plurality of position error values.

Example 14 includes the subject matter of Example 12 or 13, and optionally, wherein the GNSS processor component is to determine the selected measurement configuration based on at least one of a power consumption limit, or a position error limit.

Example 15 includes the subject matter of Example 14, and optionally, wherein the GNSS processor component is configured to determine the selected measurement configuration according to a power budget criterion, the estimated power consumption corresponding to the selected measurement is equal to or below the power consumption limit, and the estimated position error corresponding to the selected measurement configuration is a lowest of estimated position errors corresponding to configuration hypotheses having an estimated power consumption equal to or below the power consumption limit.

Example 16 includes the subject matter of Example 14, and optionally, wherein the GNSS processor component is configured to determine the selected measurement configuration according to a positioning performance budget criterion, the estimated position error corresponding to the selected measurement is equal to or below the position error limit, and the estimated power consumption corresponding to the selected measurement configuration is a lowest of estimated power consumptions corresponding to configuration hypotheses having an estimated position error equal to or below the position error limit.

Example 17 includes the subject matter of any one of Examples 12-16, and optionally, wherein the GNSS processor component is configured to receive a selection criterion indicator to indicate preference between a power budget criterion and a positioning performance budget criterion, and, based on the selection criterion indicator, to determine the selected measurement configuration according to the power budget criterion or the positioning performance budget criterion.

Example 18 includes the subject matter of any one of Examples 12-17, and optionally, wherein the GNSS processor component is configured to determine the estimated position error corresponding to the selected measurement configuration based on a Least-Square (LS) error covariance calculation.

Example 19 includes the subject matter of any one of Examples 12-18, and optionally, wherein the GNSS processor component is configured to determine an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

Example 20 includes the subject matter of any one of Examples 12-19, and optionally, wherein the GNSS processor component is configured to repeat determining the selected measurement configuration upon at least one of detection of an additional SV, disappearance of an SV, a change in a Signal to Noise Ratio (SNR) of the GNSS receiver, or a time period since determining the selected measurement configuration.

Example 21 includes the subject matter of any one of Examples 12-20, and optionally, wherein the at least one GNSS processor component comprises a positioning processor configured determine a position estimate based on the GNSS measurement.

Example 22 includes a method to be performed at a mobile device, the method comprising determining a plurality of configuration hypotheses comprising different combinations of one of a plurality of different Space Vehicle (SV) sets and one of a plurality of different duty cycle profiles; selecting from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration; and configuring a Global Navigation Satellite System (GNSS) measurement by a GNSS receiver of the mobile device using the selected SV set and according to the selected duty cycle.

Example 23 includes the subject matter of Example 22, and optionally, comprising estimating a plurality of power consumption values corresponding to respective ones of the plurality of configuration hypotheses; estimating a plurality of position error values corresponding to respective ones of the plurality of configuration hypotheses; and determining the selected measurement configuration based on a selection criterion applied to the plurality of power consumption values and the plurality of position error values.

Example 24 includes the subject matter of Example 22 or 23, and optionally, comprising determining the selected measurement configuration based on at least one of a power consumption limit, or a position error limit.

Example 25 includes the subject matter of Example 24, and optionally, comprising determining the selected measurement configuration according to a power budget criterion, the estimated power consumption corresponding to the selected measurement is equal to or below the power consumption limit, and the estimated position error corresponding to the selected measurement configuration is a lowest of estimated position errors corresponding to configuration hypotheses having an estimated power consumption equal to or below the power consumption limit.

Example 26 includes the subject matter of Example 24, and optionally, comprising determining the selected measurement configuration according to a positioning performance budget criterion, the estimated position error corresponding to the selected measurement is equal to or below the position error limit, and the estimated power consumption corresponding to the selected measurement configuration is a lowest of estimated power consumptions corresponding to configuration hypotheses having an estimated position error equal to or below the position error limit.

Example 27 includes the subject matter of any one of Examples 22-26, and optionally, comprising receiving a selection criterion indicator to indicate preference between a power budget criterion and a positioning performance budget criterion, and, based on the selection criterion indicator, determining the selected measurement configuration according to the power budget criterion or the positioning performance budget criterion.

Example 28 includes the subject matter of any one of Examples 22-27, and optionally, comprising determining the estimated position error corresponding to the selected measurement configuration based on a Least-Square (LS) error covariance calculation.

Example 29 includes the subject matter of any one of Examples 22-28, and optionally, comprising determining an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

Example 30 includes the subject matter of any one of Examples 22-29, and optionally, comprising repeating determining the selected measurement configuration upon at least one of detection of an additional SV, disappearance of an SV, a change in a Signal to Noise Ratio (SNR) of the GNSS receiver, or a time period since determining the selected measurement configuration.

Example 31 includes the subject matter of any one of Examples 22-30, and optionally, comprising determining a position estimate based on the GNSS measurement.

Example 32 includes a product comprising one or more tangible computer-readable non-transitory storage media comprising computer-executable instructions operable to, when executed by at least one computer processor, enable the at least one computer processor to implement operations at a mobile device, the operations comprising determining a plurality of configuration hypotheses comprising different combinations of one of a plurality of different Space Vehicle (SV) sets and one of a plurality of different duty cycle profiles; selecting from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration; and configuring a Global Navigation Satellite System (GNSS) measurement by a GNSS receiver of the mobile device using the selected SV set and according to the selected duty cycle.

Example 33 includes the subject matter of Example 32, and optionally, wherein the operations comprise estimating a plurality of power consumption values corresponding to respective ones of the plurality of configuration hypotheses; estimating a plurality of position error values corresponding to respective ones of the plurality of configuration hypotheses; and determining the selected measurement configuration based on a selection criterion applied to the plurality of power consumption values and the plurality of position error values.

Example 34 includes the subject matter of Example 32 or 33, and optionally, wherein the operations comprise determining the selected measurement configuration based on at least one of a power consumption limit, or a position error limit.

Example 35 includes the subject matter of Example 34, and optionally, wherein the operations comprise determining the selected measurement configuration according to a power budget criterion, the estimated power consumption corresponding to the selected measurement is equal to or below the power consumption limit, and the estimated position error corresponding to the selected measurement configuration is a lowest of estimated position errors corresponding to configuration hypotheses having an estimated power consumption equal to or below the power consumption limit.

Example 36 includes the subject matter of Example 34, and optionally, wherein the operations comprise determining the selected measurement configuration according to a positioning performance budget criterion, the estimated position error corresponding to the selected measurement is equal to or below the position error limit, and the estimated power consumption corresponding to the selected measurement configuration is a lowest of estimated power consumptions corresponding to configuration hypotheses having an estimated position error equal to or below the position error limit.

Example 37 includes the subject matter of any one of Examples 32-36, and optionally, wherein the operations comprise receiving a selection criterion indicator to indicate preference between a power budget criterion and a positioning performance budget criterion, and, based on the selection criterion indicator, determining the selected measurement configuration according to the power budget criterion or the positioning performance budget criterion.

Example 38 includes the subject matter of any one of Examples 32-37, and optionally, wherein the operations comprise determining the estimated position error corresponding to the selected measurement configuration based on a Least-Square (LS) error covariance calculation.

Example 39 includes the subject matter of any one of Examples 32-38, and optionally, wherein the operations comprise determining an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

Example 40 includes the subject matter of any one of Examples 32-39, and optionally, wherein the operations comprise repeating determining the selected measurement configuration upon at least one of detection of an additional SV, disappearance of an SV, a change in a Signal to Noise Ratio (SNR) of the GNSS receiver, or a time period since determining the selected measurement configuration.

Example 41 includes the subject matter of any one of Examples 32-40, and optionally, wherein the operations comprise determining a position estimate based on the GNSS measurement.

Example 42 includes an apparatus of a mobile device, the apparatus comprising means for determining a plurality of configuration hypotheses comprising different combinations of one of a plurality of different Space Vehicle (SV) sets and one of a plurality of different duty cycle profiles; means for selecting from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration; and means for configuring a Global Navigation Satellite System (GNSS) measurement by a GNSS receiver of the mobile device using the selected SV set and according to the selected duty cycle.

Example 43 includes the subject matter of Example 42, and optionally, comprising means for estimating a plurality of power consumption values corresponding to respective ones of the plurality of configuration hypotheses; means for estimating a plurality of position error values corresponding to respective ones of the plurality of configuration hypotheses; and means for determining the selected measurement configuration based on a selection criterion applied to the plurality of power consumption values and the plurality of position error values.

Example 44 includes the subject matter of Example 42 or 43, and optionally, comprising means for determining the selected measurement configuration based on at least one of a power consumption limit, or a position error limit.

Example 45 includes the subject matter of Example 44, and optionally, comprising means for determining the selected measurement configuration according to a power budget criterion, the estimated power consumption corresponding to the selected measurement is equal to or below the power consumption limit, and the estimated position error corresponding to the selected measurement configuration is a lowest of estimated position errors corresponding to configuration hypotheses having an estimated power consumption equal to or below the power consumption limit.

Example 46 includes the subject matter of Example 44, and optionally, comprising means for determining the selected measurement configuration according to a positioning performance budget criterion, the estimated position error corresponding to the selected measurement is equal to or below the position error limit, and the estimated power consumption corresponding to the selected measurement configuration is a lowest of estimated power consumptions corresponding to configuration hypotheses having an estimated position error equal to or below the position error limit.

Example 47 includes the subject matter of any one of Examples 42-46, and optionally, comprising means for receiving a selection criterion indicator to indicate preference between a power budget criterion and a positioning performance budget criterion, and, based on the selection criterion indicator, determining the selected measurement configuration according to the power budget criterion or the positioning performance budget criterion.

Example 48 includes the subject matter of any one of Examples 42-47, and optionally, comprising means for determining the estimated position error corresponding to the selected measurement configuration based on a Least-Square (LS) error covariance calculation.

Example 49 includes the subject matter of any one of Examples 42-48, and optionally, comprising means for determining an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

Example 50 includes the subject matter of any one of Examples 42-49, and optionally, comprising means for repeating determining the selected measurement configuration upon at least one of detection of an additional SV, disappearance of an SV, a change in a Signal to Noise Ratio (SNR) of the GNSS receiver, or a time period since determining the selected measurement configuration.

Example 51 includes the subject matter of any one of Examples 42-50, and optionally, comprising means for determining a position estimate based on the GNSS measurement.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
    a Global Navigation Satellite System (GNSS) receiver comprising circuitry to receive GNSS signals; and
    at least one GNSS processor component configured to determine a plurality of configuration hypotheses comprising different combinations of one of a plurality of different Space Vehicle (SV) sets and one of a plurality of different duty cycle profiles, the GNSS processor component configured to select from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, the GNSS processor component configured to receive a selection criterion indicator to indicate preference between a power budget criterion and a positioning performance budget criterion, and, based on the selection criterion indicator, to determine the selected measurement configuration according to the power budget criterion or the positioning performance budget criterion, the GNSS processor component to configure a GNSS measurement by the GNSS receiver using the selected SV set and according to the selected duty cycle.

2. The apparatus of claim 1, wherein the at least one GNSS processor component comprises:
    a power estimator component to estimate a plurality of power consumption values corresponding to respective ones of the plurality of configuration hypotheses;
    a position error estimator to estimate a plurality of position error values corresponding to respective ones of the plurality of configuration hypotheses; and
    a hypothesis processor component to determine the plurality of configuration hypotheses, and to determine the selected measurement configuration based on a selection criterion applied to the plurality of power consumption values and the plurality of position error values.

3. The apparatus of claim 1, wherein the GNSS processor component is to determine the selected measurement configuration based on at least one of a power consumption limit, or a position error limit.

4. The apparatus of claim 3, wherein the GNSS processor component is configured to determine the selected measurement configuration according to the power budget criterion, the estimated power consumption corresponding to the selected measurement configuration is equal to or below the power consumption limit, and the estimated position error corresponding to the selected measurement configuration is a lowest of estimated position errors corresponding to configuration hypotheses having an estimated power consumption equal to or below the power consumption limit.

5. The apparatus of claim 3, wherein the GNSS processor component is configured to determine the selected measurement configuration according to the positioning performance budget criterion, the estimated position error corresponding to the selected measurement configuration is equal to or below the position error limit, and the estimated power consumption corresponding to the selected measurement configuration is a lowest of estimated power consumptions corresponding to configuration hypotheses having an estimated position error equal to or below the position error limit.

6. The apparatus of claim 1, wherein the GNSS processor component is configured to determine the estimated position error corresponding to the selected measurement configuration based on a Least-Square (LS) error covariance calculation.

7. The apparatus of claim 1, wherein the GNSS processor component is configured to determine an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

8. The apparatus of claim 1, wherein the GNSS processor component is configured to repeat determining the selected measurement configuration upon at least one of detection of an additional SV, disappearance of an SV, a change in a Signal to Noise Ratio (SNR) of the GNSS receiver, or a time period since determining the selected measurement configuration.

9. The apparatus of claim 1, wherein the at least one GNSS processor component comprises a positioning processor configured to determine a position estimate based on the GNSS measurement.

10. The apparatus of claim 1 comprising one or more antennas, and a memory.

11. A mobile device comprising:
    one or more antennas;
    a memory;
    a processor;

a Global Navigation Satellite System (GNSS) receiver comprising circuitry to receive GNSS signals via the one or more antennas; and at least one GNSS processor component configured to determine a plurality of configuration hypotheses comprising different combinations of one of a plurality of different Space Vehicle (SV) sets and one of a plurality of different duty cycle profiles, the GNSS processor component configured to select from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, the GNSS processor component configured to determine the selected measurement configuration according to a power budget criterion, the estimated power consumption corresponding to the selected measurement configuration is equal to or below a power consumption limit, and the estimated position error corresponding to the selected measurement configuration is a lowest of estimated position errors corresponding to configuration hypotheses having an estimated power equal to or below the power consumption limit, the GNSS processor component to configure a GNSS measurement by the GNSS receiver using the selected SV set and according to the selected duty cycle, the GNSS processor component configured to determine a position estimate of the mobile device based on the GNSS measurement.

12. The mobile device of claim 11, wherein the GNSS processor component is configured to determine an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

13. The mobile device of claim 11, wherein the at least one GNSS processor component comprises:
    a power estimator component to estimate a plurality of power consumption values corresponding to respective ones of the plurality of configuration hypotheses;
    a position error estimator to estimate a plurality of position error values corresponding to respective ones of the plurality of configuration hypotheses; and
    a hypothesis processor component to determine the plurality of configuration hypotheses, and to determine the selected measurement configuration based on a selection criterion applied to the plurality of power consumption values and the plurality of position error values.

14. The mobile device of claim 11, wherein the at least one GNSS processor component is configured to determine the estimated position error corresponding to the selected measurement configuration based on a Least-Square (LS) error covariance calculation.

15. A method to be performed at a mobile device, the method comprising:
    determining a plurality of configuration hypotheses comprising different combinations of one of a plurality of different Space Vehicle (SV) sets and one of a plurality of different duty cycle profiles;
    selecting from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, wherein the selected measurement configuration is according to a positioning performance budget criterion, the estimated position error corresponding to the selected measurement configuration is equal to or below a position error limit, and the estimated power consumption corresponding to the selected measurement configuration is a lowest of estimated power consumptions corresponding to configuration hypotheses having an estimated position error equal to or below the position error limit; and
    configuring a Global Navigation Satellite System (GNSS) measurement by a GNSS receiver of the mobile device using the selected SV set and according to the selected duty cycle.

16. The method of claim 15 comprising:
    estimating a plurality of power consumption values corresponding to respective ones of the plurality of configuration hypotheses;
    estimating a plurality of position error values corresponding to respective ones of the plurality of configuration hypotheses; and
    determining the selected measurement configuration based on a selection criterion applied to the plurality of power consumption values and the plurality of position error values.

17. The method of claim 15 comprising determining an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

18. A product comprising one or more tangible computer-readable non-transitory storage media comprising computer-executable instructions operable to, when executed by at least one processor, enable the at least one processor to cause a mobile device to:
    determine a plurality of configuration hypotheses comprising different combinations of one of a plurality of different Space Vehicle (SV) sets and one of a plurality of different duty cycle profiles;
    receive a selection criterion indicator to indicate preference between a power budget criterion and a positioning performance budget criterion;
    select from the plurality of configuration hypotheses a selected measurement configuration comprising a selected SV set and a selected duty cycle profile, based at least on an estimated power consumption corresponding to the selected measurement configuration and an estimated position error corresponding to the selected measurement configuration, wherein the instructions, when executed, cause the mobile device to, based on the selection criterion indicator, determine the selected measurement configuration according to the power budget criterion or the positioning performance budget criterion; and
    configure a Global Navigation Satellite System (GNSS) measurement by a GNSS receiver of the mobile device using the selected SV set and according to the selected duty cycle.

19. The product of claim 18, wherein the instructions, when executed, cause the mobile device to:
   estimate a plurality of power consumption values corresponding to respective ones of the plurality of configuration hypotheses;
   estimate a plurality of position error values corresponding to respective ones of the plurality of configuration hypotheses; and
   determine the selected measurement configuration based on a selection criterion applied to the plurality of power consumption values and the plurality of position error values.

20. The product of claim 18, wherein the instructions when executed, cause the mobile device to determine the selected measurement configuration based on at least one of a power consumption limit, or a position error limit.

21. The product of claim 20, wherein the instructions, when executed, cause the mobile device to determine the selected measurement configuration according to the power budget criterion, the estimated power consumption corresponding to the selected measurement configuration is equal to or below the power consumption limit, and the estimated position error corresponding to the selected measurement configuration is a lowest of estimated position errors corresponding to configuration hypotheses having an estimated power consumption equal to or below the power consumption limit.

22. The product of claim 20, wherein the instructions, when executed, cause the mobile device to determine the selected measurement configuration according to the positioning performance budget criterion, the estimated position error corresponding to the selected measurement configuration is equal to or below the position error limit, and the estimated power consumption corresponding to the selected measurement configuration is a lowest of estimated power consumptions corresponding to configuration hypotheses having an estimated position error equal to or below the position error limit.

23. The product of claim 18, wherein the instructions, when, executed, cause the mobile device to determine an estimated position error corresponding to a configuration hypothesis comprising an SV set having at least one currently invisible SV, based on a combination of a first estimated position error corresponding to the SV set including the at least one currently invisible SV and a second estimated position error corresponding to the SV set excluding the at least one currently invisible SV.

24. The product of claim 18, wherein the instructions, when executed, cause the mobile device to repeat determining the selected measurement configuration upon at least one of detection of an additional SV, disappearance of an SV, a change in a Signal to Noise Ratio (SNR) of the GNSS receiver, or a time period since determining the selected measurement configuration.

25. The product of claim 18, wherein the instructions, when executed, cause the mobile device to determine a position estimate based on the GNSS measurement.

* * * * *

UNITED STATES PATENT AND TRADEMARK OFFICE
CERTIFICATE OF CORRECTION

PATENT NO. : 10,371,824 B2
APPLICATION NO. : 15/281114
DATED : August 6, 2019
INVENTOR(S) : Ran Harel et al.

Page 1 of 1

It is certified that error appears in the above-identified patent and that said Letters Patent is hereby corrected as shown below:

In the Claims

In Column 31, Line 13, in Claim 20, delete "wherein the instructions when executed," and insert -- wherein the instructions, when executed, --, therefor.

In Column 32, Line 11, in Claim 23, delete "when, executed, cause the" and insert -- when executed, cause the --, therefor.

Signed and Sealed this
Seventeenth Day of December, 2019

Andrei Iancu
*Director of the United States Patent and Trademark Office*